US008911849B2

(12) United States Patent
Sakamoto et al.

(10) Patent No.: US 8,911,849 B2
(45) Date of Patent: Dec. 16, 2014

(54) HONEYCOMB STRUCTURE

(71) Applicant: NGK Insulators Ltd., Nagoya (JP)

(72) Inventors: Hirofumi Sakamoto, Nagoya (JP);
Koichi Okada, Nagoya (JP); Toshio
Yamada, Nagoya (JP); Toshihiro
Hirakawa, Nagoya (JP)

(73) Assignee: NGK Insulators, Ltd., Nagoya (JP)

( * ) Notice: Subject to any disclaimer, the term of this
patent is extended or adjusted under 35
U.S.C. 154(b) by 0 days.

(21) Appl. No.: 14/011,248

(22) Filed: Aug. 27, 2013

(65) Prior Publication Data
US 2013/0344283 A1 Dec. 26, 2013

Related U.S. Application Data

(63) Continuation of application No. PCT/JP2012/055965,
filed on Mar. 8, 2012.

(30) Foreign Application Priority Data

Mar. 10, 2011 (JP) .................. 2011-053208

(51) Int. Cl.
B01D 46/24 (2006.01)
C04B 38/00 (2006.01)
(52) U.S. Cl.
CPC ......... B01D 46/2418 (2013.01); C04B 38/0016
(2013.01); B01D 46/2459 (2013.01); B01D
46/2455 (2013.01); B01D 46/247 (2013.01);
B01D 46/2466 (2013.01)
USPC .............. 428/116; 55/523; 422/180
(58) Field of Classification Search
CPC .............. F01N 3/0222; F01N 2330/06; F01N
2330/32; F01N 2330/14; F01N 2330/18;
F01N 2330/60; F01N 2260/10; F01N 2260/08;
B01D 46/2466; B01D 46/2455; C04B
38/0016; C04B 38/00149
USPC ........................... 428/116–118; 55/522–524;
422/169–172, 177–182
See application file for complete search history.

(56) References Cited

U.S. PATENT DOCUMENTS 7,393,376 B2 * 7/2008 Taoka et al. .................... 55/523
2004/0258582 A1 12/2004 Miwa et al.
(Continued)

FOREIGN PATENT DOCUMENTS

JP 2003-254034 9/2003
JP 2003-291054 10/2003
(Continued)

OTHER PUBLICATIONS

International Search Report, International Application No. PCT/
JP2012/055965, dated Jun. 12, 2012 (3 pages).

Primary Examiner — David Sample
Assistant Examiner — Nicholas W Jordan
(74) Attorney, Agent, or Firm — Burr & Brown, PLLC

(57) ABSTRACT

There is disclosed a honeycomb structure including: a plurality of honeycomb segments each having porous partition walls, and plugged portions arranged in open frontal areas of the predetermined cells; joining portions in which the plurality of honeycomb segments are joined; and an outer peripheral wall, and having: an aspect ratio (a long axis/a short axis) of 1.2 or more, wherein corners which are regions of the joining portions in the region of 10 mm or less from each intersection between the joining portion and the outer peripheral wall along a direction of the short axis are present in the region of 25 mm or less, and a thickness of each of the joining portions is 0.5 mm or more and 5 mm or less, and a thickness of each of the other joining portions is 1.5 mm or less.

4 Claims, 6 Drawing Sheets

(56) References Cited

U.S. PATENT DOCUMENTS

2005/0166729 A1 8/2005 Nishio et al.
2005/0247038 A1* 11/2005 Takahashi ...................... 55/523
2006/0213163 A1 9/2006 Taoka et al.

FOREIGN PATENT DOCUMENTS

| | | |
|---|---|---|
| JP | 2007-229700 | 9/2007 |
| WO | 2003/078026 | 9/2003 |

* cited by examiner

HONEYCOMB STRUCTURE

BACKGROUND OF THE INVENTION

1. Field of the Invention

The present invention relates to a honeycomb structure, and more particularly, it relates to a honeycomb structure in which an aspect ratio of each end surface is 1.2 or more, and cracks are not easily generated in each joining portion between filters, when a difference in temperature between the inside and the outside of the filter is made.

2. Description of Related Art

Heretofore, a honeycomb structure made of a ceramic material has been used in a catalyst carrier which utilises a catalytic action, a filter which collects a particulate matter in an exhaust gas, especially diesel fine particles (a diesel particulate filter hereinafter abbreviated to "DPF" sometimes), or the like for an internal combustion engine, a boiler, a chemical reaction device, a reformer for a fuel cell, or the like.

The honeycomb structure for use in this purpose usually has a plurality of cells which are defined by porous partition walls and which become through channels of a fluid. When the honeycomb structure is used as the particulate matter collecting filter, plugged portions are arranged in end portions of adjacent cells on opposite sides to form checkered patterns in end surfaces. In a honeycomb structure body having such a structure, a fluid to be treated flows into a cell which is not provided with the plugged portion is an inflow side and surface, i.e., the cell provided with the plugged portion in an outflow side end surface, passes through the porous partition wall, and is discharged from the adjacent cell, i.e., the cell which is provided with the plugged portion in the inflow side end surface and is not provided with the plugged portion in the outflow side end surface. In this case, the partition wall serves as the filter. For example, when the honeycomb structure is used as the DPF, a particulate setter (hereinafter abbreviated, to "PM" sometimes) such as soot discharged; from a diesel engine is collected by the partition walls and deposited on the partition walls.

Such a honeycomb structure is known which is obtained by joining a plurality of honeycomb segments having a honeycomb shape together by a joining material. Specifically, an example of the honeycomb structure is a honeycomb structure including a honeycomb structure section obtained by joining a plurality of honeycomb segments having a honeycomb shape together by a joining material, and an outer peripheral wall forced to cover an outer peripheral surface of this honeycomb structure section (see, e.g., Patent Document 1).

PRIOR ART DOCUMENT

Patent Document

[Patent Document 1] JP-A-2003-231054

SUMMARY OF THE INVENTION

In an exhaust gas purifying filter for an internal combustion engine, a soot mass limit (hereinafter abbreviated to "SML" sometimes), a pressure loss and cost are important. It is considered that enhancement of the SML is accomplished by a technique of increasing a filter capacity or a technique of densifying a filter base material. However, in the former technique, the cost increases, and in the latter technique, the pressure loss increases. It is considered that the problem is solved by another method in which a base material such as SiC or $Si_3N_4$ having a high thermal conductivity is used.

However, these base materials have the disadvantage that a thermal expansion coefficient is large. Consequently, there is employed a structure in which what are called segments having a quadrangular or triangular pillar shape are joined to one another by a joining material, so that thermal expansion of the segments is absorbed by the joining material, to compensate for the disadvantage that the thermal expansion coefficient of the base material is high, sometimes. However, the disadvantage that the thermal expansion coefficient is high is not changed. Consequently, when excessive soot (a particulate matter in an exhaust gas) is deposited on the filter and burnt, cracks are generated in the base material or joining portions, which affects a function of the filter. In particular, when a shape of end surfaces is not round, there has been a tendency that cracks are more easily generated on conditions involving a rapid temperature change, as compared with a case where the shape of the end surfaces is round.

The present invention has been developed in view of such problems of conventional technologies, and an object thereof is to provide a honeycomb structure having an aspect ratio (a long axis/a short axis) of 1.2 or more, in which the long axis is the longest portion on each of end surfaces of the honeycomb structure, and the short axis is the longest portion orthogonal to the long axle on the end surface, so that cracks are not easily generated.

As a result of intensive investigation to achieve the above object by the inventors, it has been found that the above object can be achieved by regulating a thickness of each joining portion of a specific region, and the present invention has bean completed.

According to the present invention, a honeycomb structure is provided as follows.

[1] A honeycomb structure comprising: a plurality of honeycomb segments each having porous partition walls with which a plurality of cells extending from, one end surface to the other end surface are formed to become through channels of a fluid, and plugged portions arranged in open frontal areas of the predetermined cells in the one end surface and open frontal areas of the regaining cells in the other end surface, the honeycomb segments being arranged adjacent to each other so that side surfaces of the honeycomb segments face each other; joining portions in which the facing side surface of the plurality of honeycomb segments are joined to each other; and an outer peripheral wall which covers an outer peripheral surface of a honeycomb structure section constituted of the plurality of honeycomb segments and the joining portions, the honeycomb structure having au aspect ratio (a long axis/a short axis) of 1.2 or more, in which the long axis is the longest portion on each of the end surfaces of the honeycomb structure, and the short axis is the longest portion orthogonal to the long axis on the end surface, therein corners which are regions of the joining portions in the region of 10 mm or less from each intersection between the joining portion and the outer peripheral wall along a direction of the short axle are present in the region of 25 mm or less from a straight line which passes through the center of the long axis and is parallel to the short axis, and a thickness of each of the joining portions including the corners present in the region of 25 mm or lees from the straight line which passes through the center of the long axis and is parallel to the short axis is 0.5 mm or more and 5 or lees, and a thickness of each of the other joining portions is 1.5 mm or less.

[2] The honeycomb structure according to the above [1], wherein the thickness of each of the joining portions including the corners present in the region of 25 mm or less from the straight line which passes through the center of the long axis and is parallel, to the short axis is 1.0 mm or more and 1.5 mm or less.

[3] The honeycomb structure according to the above [1], wherein a length of the short axis is 150 mm or more.

[4] The honeycomb structure according to any one of the above [1] to [3], wherein the thickness of each of the other joining portions is smaller than the thickness of each of the joining portions including the corners present in the region of 25 mm or less.

[5] The honeycomb structure according to any one of the above [1] to [4], wherein the joining portions other than the joining portions including the corners present in the region of 25 mm or less from the straight line which passes through the center of the long axis and is parallel to the short axes include at least one joining portion having a thickness smaller than 0.5 mm.

According to the honeycomb structure of the present invention in which an aspect ratio is 1.2 or more, a thickness of each of joining portions including corners present in the region of 25 mm or less from a straight line which passes through the center of a long axis and is parallel to a short axis is 0.5 mm or more and 5.0 mm or less, and hence generation of cracks due to a rapid temperature change in end outfaces of the honeycomb structure is suppressed. Here, the corners are regions of the joining portions in the region of 10 mm or less from each intersection between the joining portion and the outer peripheral wall along a direction of the short axis.

DETAILED DESCRIPTION OF THE INVENTION

Hereinafter, embodiments of the present invention will be described, but it should be understood that the present invention is not limited to the following embodiments and chat suitable modifications, improvements and the like added to the following embodiments on the basis of ordinary knowledge of a person skilled in the art without departing from the gist of the present invention also fail in the gist of the present invention.

Figure 1:
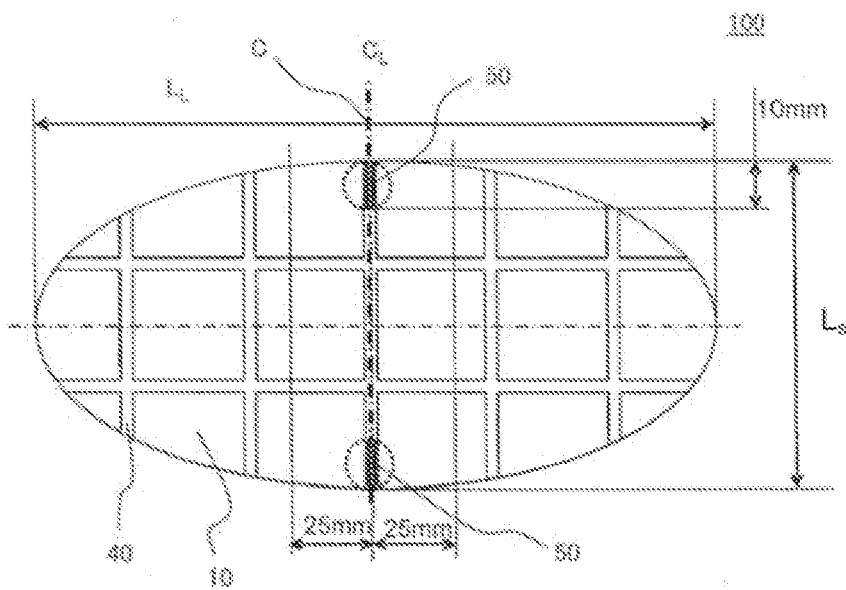
FIG. 1 is a plan view showing an end surface of a first embodiment of a honeycomb structure of the present invention.
Figure 2:
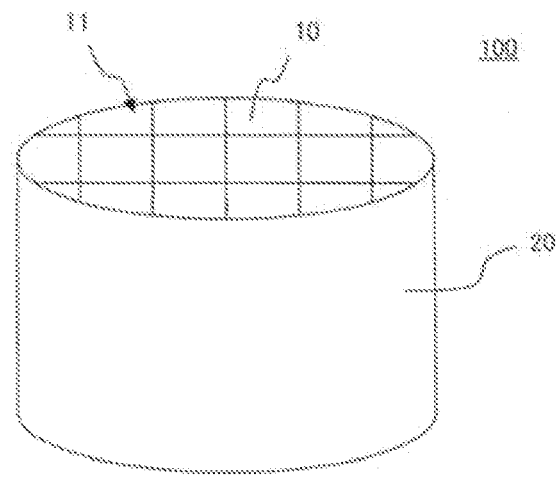
FIG. 2 is a schematic perspective view showing the first embodiment of the honeycomb structure of the present invention.
Figure 3:
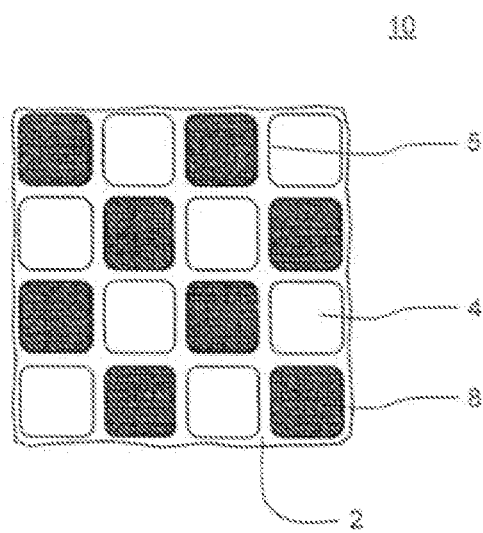
FIG. 3 is a plan view showing an end surface of a honeycomb segment constituting she first embodiment of the honeycomb structure of the present invention.

[1] Honeycomb Structure:

FIG. 1 is a plan view showing an end surface of a first embodiment of a honeycomb structure of the present invention, FIG. 2 is a schematic perspective view showing the first embodiment of the honeycomb structure of the present invention, and FIG. 3 is a plan view showing an and surf see of a honeycomb segment constituting the first embodiment of the honeycomb structure of the present invention. As shown in FIG. 1 to FIG. 3, a honeycomb structure 100 of the present embodiment includes a honeycomb structure section 11 constituted of a plurality of honeycomb segments 10 each having porous partition walls 5 with which a plurality of cells 4 extending from one end surface 2 to the other end surface 2 are formed to become through channels of a fluid, and plugged portions 8 arranged in open frontal areas of the predetermined cells 4 in the one end surface 2 and open frontal areas of the remaining cells 4 in the other end surface 2; and an outer peripheral wall 20 formed to cover an outer peripheral surface of the honeycomb structure section 11.

As shown in FIG. 1, the honeycomb structure 100 of the present embodiment has an aspect ratio (a long axis/a short axis) of 1.2 or more, in which a long axis $L_L$ is the longest portion on each of the end surfaces, and a short axis $L_S$ is the longest portion orthogonal to the long axis $L_L$ on the end surface. That is, the aspect ratio of the long axis $L_L$ to the short axis $L_S$ is 1.2 or more. In the honeycomb structure 100, when a DPF central portion has a high temperature and an outer peripheral portion has a low temperature, an expanding force is generated in the central portion, but in the outer peripheral portion, which is a lower temperature region, the expansive force is not generated so much as in the central portion, and hence a tensile stress is generated. When the aspect ratio is 1.2 or more, the tensile stress is maximized in the central portion in a long axis direction. When a joining portion 40 is present in this central portion, cracks are generated in the joining portion, because a peel strength of the smaller then a base material strength. As a joining material for use in the joining portions 40, a material, having a predetermined. Young's modulus is usually used to prevent the cracks frost being generated. However, when the joining portions 40 are thin, the stress cannot be absorbed with the Young's modulus of the joining material, which results in the generation of the cracks.

Figure 10:
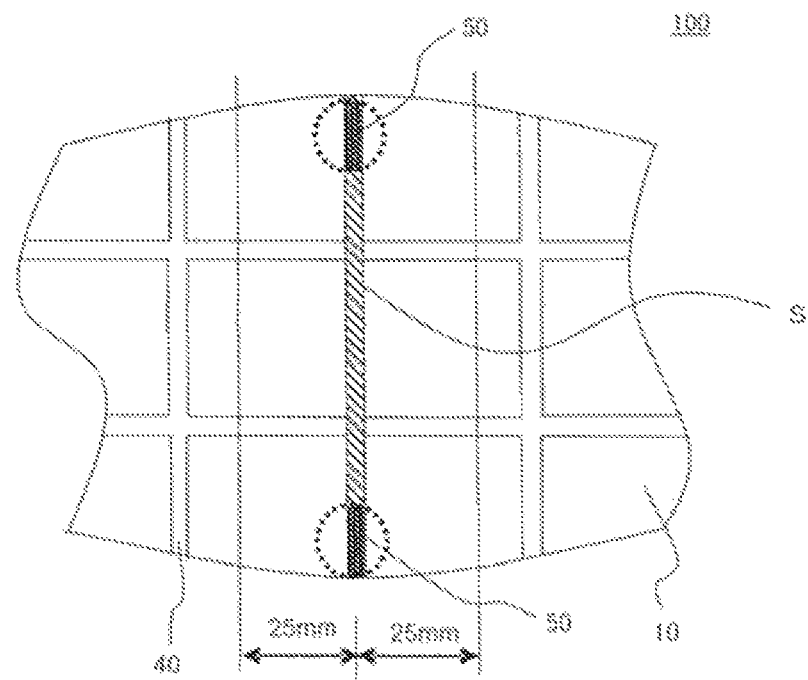
FIG. 10 is an enlarged view of a part of the end surface of the first embodiment of the honeycomb structure of the present invention, and is a view for explaining joining portions including corners.
Figure 11:
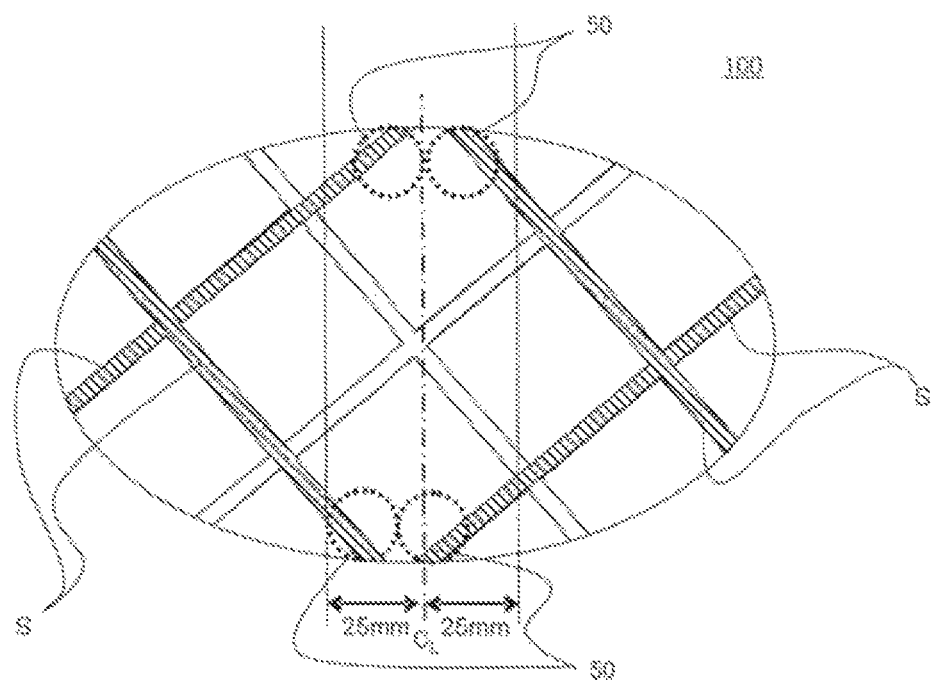
FIG. 11 is an enlarged view of the end surface of the fourth embodiment of the honeycomb structure of the present invention, and is a view for explaining joining portions including corners.

To solve the problem, in the honeycomb structure 100 of the present embodiment, corners which are regions of the joining portions 40 in the region of 10 mm or less from each intersection between the joining portion 40 and the outer peripheral, wall 20 along a direction of the short axis $L_S$ are present in the region ox 25 mm or less from a straight line which passes through a center C of the long axis $L_L$ and is parallel to the short axis $L_S$, and a thickness of each of the joining portions 40 including corners 50 "present in the region of 2 mm or less from the straight line which passes through, the center of the long axis and is parallel to the short axis" is 0.5 mm or more. Here, the thickness of each of the joining portions indicates a distance between side surfaces of the honeycomb segments joined by the joining portion. Moreover, each of the joining portions including the corners indicates the whole joining portion present in a portion where the joining portion forming the corner is extended in a direction perpendicular to a thickness direction of the joining portion. That is, a slant portion S of FIG. 10 and FIG. 11 is indicated. The thickness of each of the joining portions 40 including the corners 50 present in the region of 25 mm or less from the straight line which passes through the center of the long axis and is parallel to the short axis is preferably from 0.5 to 5.0 mm, and further preferably from 1.0 to 1.5 mm. When the thickness is smaller than 0.5 mm, the cracks are easily generated at the corners due to a rapid temperature change. When the thickness is larger than 5.0 mm, an area of the joining portion 40 increases in a cross section perpendicular to a passing direction of the exhaust gas (an extending direction of the cells), and hence when the exhaust gas is allowed to flow, a pressure loss increases sometimes.

The thickness of each of the joining portions 40 other than the joining portions including the corners 50 present in the region of 25 mm or less from the straight line which passes through the center of the long axis and is parallel to the short axis is preferably 1.5 mm or less, and further preferably from 0.1 to 1.5 mm. When the thickness is smaller than 0.1 mm, a force to join the honeycomb segments 10 decreases sometimes. Furthermore, the adjacent honeycomb segments 10 come in contact with each other sometimes. When the thickness is larger than 1.5 mm, the area of the joining portion 40 increases in the cross section perpendicular to the passing direction of the exhaust gas (the cell extending direction). Therefore, when the exhaust, gas is allowed to flow, the pressure loss increases sometimes. It is to be notes that the thickness of the joining portion 40 is a distance between the adjacent honeycomb segments 10.

In the honeycomb structure of the present embodiment, the thickness of each of the joining portions 40 other than the joining portions including the corners 50 present in the region of 25 mm or less from the straight line which passes through the center of the long axis and is parallel to the short axis is preferably smaller than the thickness of each of the joining portions including the corners 50 present in the region of 35 mm or less from the straight line which passes through the center of the long axis and is parallel to the short axis. The honeycomb structure for use in an exhaust gas purifying filter for an internal combustion engine or the like preferably has less pressure loss. An example of a method for decreasing the pressure loss of the honeycomb structure is a method of increasing an open area ratio of the end surface. In the honeycomb structure including the honeycomb segments and the joining portions, the open area ratio can be increased by decreasing the thickness of each of the joining portions. In the honeycomb structure of the present embodiment, the thickness of each of the joining portions 40 other than the joining portions including the corners 50 present in the region of 25 mm or less from one straight line which passes through the center of the long axis and is parallel to the short axis is smaller than the thickness of each of the joining portions including the corners 50 present in the region of 25 mm or less from the straight line which passes through the center of the long axis and is parallel to the short axis, so that it is possible to efficiently increase the open area ratio and decrease the pressure loss while suppressing the generation of the cracks.

In the honeycomb structure of the present embodiment, the joining portions 40 other than the joining portions including the corners 50 present in the region of 25 mm or less frost the straight line which passes through the center of the long axis and is parallel to the short axis preferably include at least one joining portion 40 having a thickness smaller than 0.5 mm.

The honeycomb structure for use in the exhaust gas purifying filter for the internal combustion engine or the like preferably has less pressure loss. The example of the method for decreasing the pressure loss of the honeycomb structure is the method of increasing the open area ratio of the end surface. In the honeycomb structure including the honeycomb segments and the joining portions, the open area ratio can be increased by decreasing the thickness of each of the joining portions. In the honeycomb structure of the present embodiment, the thickness of at least one of the joining portions 40 other than the joining portions including the corners 50 present in the region of 25 mm or less from the straight line which passes through the center of the long axis and is parallel to the short axis is smaller than 0.5 mm, so that it is possible to increase the open area ratio and decrease the pressure loss while suppressing the generation of the cracks. The thickness of at least one of the joining portions 40 other than the joining portions including the corners 50 present in the region of 25 mm or less from the straight line which passes through the center of the long axis and is parallel to the short axis is preferably 0.1 mm or less and smaller than 0.5 mm.

Examples of the whole shape of the honeycomb structure 100 of the present embodiment in the cross section perpendicular to the extending direction of the cells 4 include a triangular shape, a quadrangular shape, a hexagonal shape, an octagonal shape, a round shape, and combinations of these shapes (e.g., a case where the whole shape in the one end surface is quadrangular, and the whole shape in the other end surface is round, etc.).

There is not any special restriction on a size of the whole honeycomb structure 100, and a desirable size can be obtained. Specifically, a length of the long axis of the honeycomb structure 100 is preferably from 80 to 300 mm, and further preferably from 100 to 280 mm. Moreover, a length of the honeycomb structure 100 in the extending direction of the cells 4 (the length in a central axis direction) is preferably from 100 to 350 mm, and further preferably from 100 to 300 mm.

[1-1] Honeycomb Segment:

A material of the honeycomb segments 10 is preferably a ceramic material, and further preferably at least one selected from the group consisting of silicon carbide (SiC), silicon nitride ($Si_3N_4$), a silicon-silicon carbide composite material, cordierite, mullite, alumina, spinel, a silicon carbide-cordierite composite material, lithium aluminum silicate, aluminum titanate, and iron-chromium-aluminum alloy, because of excellent strength and heat resisting properties. Among these materials, silicon carbide is preferable. A content of a ceramic raw material is preferably from 40 to 90 mass % of the whole forming raw material.

The honeycomb segments 10 (the partition walls 5 constituting the honeycomb segments 10) are preferably porous, A porosity of the honeycomb segments 10 is preferably from 10 to 70%, and further preferably from 40 to 60%. When the porosity is in such a range, the pressure loss can be decreased while maintaining the strength. When the porosity is smaller than 30%, the pressure loss increases sometimes. When the porosity is in excess of 70%, the strength deteriorates or a thermal conductivity decreases sometimes. The porosity is a value measured by a mercury porosimeter.

An average pore diameter of the honeycomb segments 10 is preferably from 5 to 30 μm, and further preferably from 10 to 25 μm. When the average pore diameter is in such a range, a particulate matter (PM) can effectively be collected. When the average pore diameter is smaller than 5 μm, clogging with the particulate matter (PM) is easily caused. When the average pore diameter is in excess of 30 μm, the particulate matter (PM) is not collected by the filter but passes through the filter sometimes. The average pore diameter is a valve measured by the mercury porosimeter.

When the material of the honeycomb segments 10 is silicon carbide, an average particle diameter of silicon carbide particles is preferably from 5 to 40 µm. When the material has such an average particle diameter, the porosity and pore diameters are advantageously easily controlled to be suitable for the filter. When the average particle diameter is smaller than 5 µm, the pore diameters excessively decrease, and when the average particle diameter is larger than 40 µm, the porosity excessively increases sometimes. When the pore diameters excessively decrease, the clogging with the particulate matter (PM) is easily caused, and when the porosity excessively increases, the pressure loss increases sometimes. The average particle diameter of the raw material is a value measured toy a method which conforms to JIS R 1629.

A shape of the cells 4 of the honeycomb segments 10 (the shape of the cells 4 in the cross section perpendicular to the extending direction of the cells 4 of the honeycomb structure 100) is preferably a quadrangular shape, a hexagonal shape, an octagonal shape or a combination of the shapes, and is further preferably a square shape or a rectangular shape.

A thickness of the partition wall 5 is preferably from 0.20 to 0.50 mm, and further preferably from 0.25 to 0.45 mm. When the thickness of the partition wall 5 is sisal let than 0.20 mm, the strength of the honeycomb structure 100 deteriorates sometimes. When the thickness of the partition wall 5 is larger than 0.50 mm, an area of the partition wall 5 to treat the exhaust gas decreases, and an ability to treat the exhaust gas deteriorates sometimes. Moreover, the pressure loss at the treatment of the exhaust gas increases sometimes.

A cell, density of the honeycomb segments 10 is preferably from 20 to 90 cells/cm$^2$, and further preferably from 10 to 70 cells/cm$^2$. When the cell density is smaller than 20 cells/cm$^2$, the thickness of the partition wall excessively increases, or a cell width excessively increases sometimes. When the cell density is larger than 90 cells/cm$^2$, the thickness of the partition wall excessively decreases, or the cell width excessively decreases sometimes.

Moreover, the number of the honeycomb segments 10 in the cross section of the honeycomb structure 100 of the present embodiment which is perpendicular to the extending direction of the cells 4 is preferably from 4 to 60, and further preferably from, 9 to 40. As a size of the honeycomb segment 10, an area of a cross section of the honeycomb segment which is perpendicular to the extending direction of the cells 4 is preferably from 9 to 25 cm$^2$, and further preferably from 12 to 19 cm$^2$. When the area is smaller than 9 cm$^2$, the pressure loss at the flowing of the exhaust gas through the honeycomb structure 100 increases sometimes, and when the area is larger than 25 cm$^2$, the honeycomb segments 10 slight foe damaged.

The plurality of honeycomb segments is are the polygonal pillar-like honeycomb segments 10. Examples of a shape of the pillar-like honeycomb segments 10 specifically include a quadrangular pillar shape, a hexagonal pillar shape, an octagonal pillar shape, a triangular pillar shape, and a columnar shape. Alternatively, the shapes may be combined. Among these shapes, the quadrangular pillar shape is preferable as shown in FIG. 2, from the viewpoint that honeycomb segments can easily be manufactured.

In the honeycomb structure 100 (the honeycomb structure section 11), as shown in FIG. 1 and FIG. 2, the plurality of honeycomb segments 10 are arranged adjacent to each other so that the side surfaces of the honeycomb segments face each other, and the facing side surfaces are joined to each other by the joining portion 40. The joining portion 40 is preferably disposed entirely on the facing side surfaces of the adjacent honeycomb segments 10. A material of the joining portions 40 is preferably obtained by adding additives such as an organic binder, resin balloon and dispersant to inorganic raw materials such as inorganic fiber, colloidal silica, clay and silicon carbide (SiC) particles, further adding water, and kneading the materials.

A material (a ceramic raw material) of the plugged portions 8 and a material of the partition walls 5 constituting the honeycomb structure 100 are preferably the same. In consequence, at firing, the plugged portions 8 are firmly bonded to the partition walls 5.

The plugged portions 8 are preferably alternately arranged in the predetermined cells 4 and the remaining cells 4 so as to form a checkered pattern in each of the end surfaces of the honeycomb segment 10.

A depth of the plugged portion 8 is preferably from 1.0 to 15.0 mm, and further preferably from 3.0 to 12.0 mm. When the depth is smaller than 1.0 mm, a strength of the plugged portion 8 might deteriorate. On the other hand, when the depth is larger than 15.0 mm, an area of the partition wall 5 to collect the PM might decrease. Here, the depth of the plugged portion 8 means a length of the plugged portion 8 in the extending direction of the cells 4.

[1-2] Outer Peripheral Wall:

As described above, the outer peripheral wall 20 is formed to cover the outer peripheral surface of the honeycomb structure section 11. With the result that the outer peripheral wall 20 is formed as described above, concaves end convexes of an outer periphery of the honeycomb structure 100 can further be decreased.

The outer peripheral wall 20 is preferably an integrally formed wall which is formed integrally with a porous base material at formation. However, after the formation, an outer periphery of the porous base material may be ground and formed into a predetermined shape to obtain a cement coating wall which is the outer peripheral wall made of a ceramic cement material. In the case of the integrally formed wall, the material of the outer peripheral wall 20 and the material of the partition walls 5 are preferably the same. Moreover, when the outer peripheral wall 20 is the cement coating wall, an example of a material of the cement coating wall is a material obtained by adding a flux component such as glass to a common base.

A thickness of the outer peripheral wall 20 is preferably from 0.1 to 3.0 mm, and further preferably from 0.3 to 2.0 mm. When the thickness is smaller than 0.1 mm, the cracks are easily generated sometimes at coating of the outer periphery. When the thickness is larger than 3.0 mm, the pressure loss increases sometimes at the flowing of the exhaust gas.

[1-3] Catalyst:

In the honeycomb structure of the present invention, a catalyst may be loaded onto the partition walls. With the result that the catalyst is loaded, purification of CO, HC and NO$_x$ included in the exhaust gas can be accomplished.

Examples of the catalyst include a ternary catalyst, an oxidation catalyst, an SCR catalyst for NO$_x$ selective reduction and an NO$_x$ adsorber. The oxidation catalyst contains a noble metal. This noble metal is preferably at least one selected from the group consisting of platinum (Pt), rhodium (Rh), and palladium (Pd). A total amount of the noble metal is preferably from 10 to 100 g per unit volume (one liter) of the honeycomb structure 100.

The ternary catalyst is a catalyst mainly for the purification of hydrocarbons (HC), carbon monoxide (CO) and nitrogen oxides (NO$_x$). An example of the catalyst is a catalyst containing platinum (Ft), palladium; (Pd and rhodium (Rh). By this ternary catalyst, hydrocarbons are changed to water and carbon, dioxide, carbon monoxide is changed to carbon dioxide, and nitrogen oxides are changed to nitrogen, respectively, through purification by oxidation or reduction.

Art example of the SCR catalyst for $NO_x$ selective reduction is a catalyst containing at least one selected from the group consisting of metal-substituted zeolite, vanadium, titania, tungsten oxide, silver, and alumina. Moreover, an example of the $NO_x$ adsorber is an alkali metal and/or an alkali earth metal. Examples of the alkali metal include K, Na and Li. An example of the alkali earth metal is Ca. A total amount of E, Na, Li and Ca is preferably from 30 to 300 g per unit volume (one liter) of the honeycomb structure 100.

[2] Manufacturing Method of Honeycomb Structure:

The one embodiment of the honeycomb structure of the present, invention can be prepared, for example, as follows.

[2-1] Preparation of Honeycomb Segment:

First, a binder, a surfactant, a pore former, water and the like are added to a ceramic raw material to obtain, a forming raw material. The ceramic raw material is preferably at least one selected from the group consisting of silicon carbide, a silicon-silicon carbide composite material, cordierite, mullite, alumina, spinel, a silicon carbide-cordierite composite material, lithium aluminum silicate, aluminum titanate, and iron-chromium-aluminum alloy. Among these materials, silicon carbide or the silicon-silicon carbide composite material is preferable, when the silicon-silicon carbide composite material is used, a mixture of silicon carbide powder and metal silicon powder is the ceramic raw material. A content of the ceramic raw material is preferably from 40 to 90 mass % of the whole forming raw material.

Examples of the binder include methylcellulose, hydroxypropoxyl cellulose, hydroxyethylcellulose, carboxymethylcellulose, and polyvinyl alcohol. Among these binders, methylcellulose and hydroxypropoxyl cellulose are preferably used together. A content of the binder is preferably from 2 to 20 mass % of the whole forming raw material.

A content of the water is preferably from 7 to 45 mass % of the whole forming raw material.

As the surfactant, ethylene glycol, dextrin, fatty acid soap, polyalcohol or the like can be used. One of these surfactants may fee used alone, or a combination of two or more of the surfactants may foe used. A content of the surfactant is preferably 5 mass % or less of the whole forming raw material.

There is not any special restriction on the pore former, when the pore formers are fired to form pores, and examples of the pore former include starch, resin balloon, a water-absorbing resin and silica gel. A content of the pore former is preferably 15 mass % or less of the whole forming raw material.

Next, the forming raw material is kneaded to form a kneaded material. There is not any special restriction on a method of kneading the forming raw material to form the kneaded, material, and an example of the method is a method using a kneader, a vacuum clay kneader or the like.

Next, the kneaded material is extruded to obtain a plurality of formed honeycomb bodies. In the extrusion forming, a die having a desirable honeycomb segment shape, cell shape, partition wall thickness, cell density or the like is preferably used. As a material of the die, a hard metal which does not easily wear down is preferable. Sash of the formed honeycomb bodies has porous partition walls with which a plurality of cells are formed to become through channels of a fluid and an outer peripheral wall positioned at the outermost periphery.

The partition wall thickness, cell density, outer peripheral portion thickness and the like of the formed honeycomb body can suitably be determined in accordance with a structure of a honeycomb structure body of the present invention to be prepared, in consideration of shrinkages at drying and firing.

The obtained formed honeycomb bodies are preferably dried before firing. There is not any special restriction on a drying method, and examples of the method include electromagnetic heating systems such as microwave heating drying and high frequency dielectric heating drying, and external heating systems such as hot air drying and superheat vapor drying. Among these methods, from the viewpoint that all the formed bodies can rapidly and uniformly be dried without generating any cracks, a predetermined amount of water is dried by the electromagnetic heating system, and then the remaining water is dried by the external heating system. As drying conditions, the water of 30 to 90 mass % of the water before the drying is removed by the electromagnetic heating system, and then the water is decreased down, to 3 mass % or less by the external heating system. The electromagnetic heating system is preferably the dielectric beating drying, and the external heating system is preferably the hot air drying.

When a length of the formed honeycomb body in the cell extending direction is not a desirable length, both end surfaces (both end portions) of the formed honeycomb body are cut so as to obtain the desirable length. There is not any special restriction on a cutting method, but an example of the method is a method using a round saw cutter or the like.

Next, the formed honeycomb body is preferably fired to prepare a fired honeycomb body. Prior to the firing, calcinating is preferably performed to remove the binder and the like. The calcinating is preferably performed at 400 to 500° C. in the atmosphere for 0.5 to 20 hours. There is not any special restriction on a calcinating and firing method, and the firing can be performed by using an electric furnace, a gas furnace or the like. As firing conditions, heating is preferably performed at 1300 to 1500° C. in an inert atmosphere of nitrogen, argon or the like for one to 20 hours.

Next, in the obtained fired honeycomb body, plugged portions are formed in open frontal areas of predetermined cells in a fluid inlet side end surface, and open frontal areas of the remaining cells in a fluid outlet side end surface, to prepare a honeycomb segment. There is not any special restriction on a method of forcing the plugged portions, but an example of the method is the following method. A sheet is attached to the one end surface of the fired honeycomb body, and than holes are made at positions of the sheet which correspond to the cells to be provided with the plugged portions. Then, the end surface of the fired honeycomb body to which the sheet has been attached is immersed into a plugging slurry obtained by slurrying a constituent material of the plugged portions, and the open frontal areas of the cells to be provided with the plugged portions are charged with the plugging slurry through the holes made in the sheet.

Then, plugged portions are formed in the cells in the other end surface of the fired honeycomb body which are not provided with the plugged portions in the one end surface, by a method similar to the above-mentioned method of forming the plugged portions in the one end surface (charging with the plugging slurry). As the plugging slurry, a mixture obtained by adding a binder such as methylcellulose and the pore former to the ceramic raw material of the formed honeycomb body is preferably used. After forming the plugged portions, firing is preferably performed on conditions similar to the above firing conditions. Moreover, the plugged portions may be formed prior to the firing of the formed honeycomb body.

[2-2] Preparation of Honeycomb Structure:

The predetermined number of the honeycomb segments are joined by a joining material, and dried, to form a honeycomb structure in which the plurality of honeycomb segments are arranged adjacent to each other so that side surfaces of the honeycomb segments face each other and in which the facing side surfaces are joined to each other by a joining portion. The joining portion is preferably entirely disposed on the facing side surfaces. The joining portions perform a function of buffering (absorbing) a volume change when the honeycomb segments thermally expand or thermally contract, and also perform a function of joining the respective honeycomb segments.

There is not any special restriction on a method of coating the side surfaces of the honeycomb segments with the joining material, and a coating method by a brush or the like can be used.

An example of the joining material is a slurry obtained by adding additives such as an organic binder, resin balloon and dispersant to inorganic raw materials such as an inorganic fiber, colloidal silica, clay and SiC particles, further adding water, and kneading those materials.

The plurality of honeycomb segments are joined by the joining material, and dried to obtain a joined honeycomb segment assembly (the honeycomb structure section). Next, an outer peripheral portion of the joined honeycomb segment assembly is cut along a predetermined cutting line, to obtain the joined honeycomb segment assembly subjected to the cut processing. On an outer peripheral surface of the joined honeycomb segment assembly subjected to the cut processing, an outer periphery coating treatment is performed to form an outer peripheral wall. An example of an outer periphery coating treatment method is a method of coating the outer peripheral surface of the joined honeycomb segment assembly with the outer periphery coating material and drying the material, as the outer periphery coating material, for example, a mixture of an inorganic fiber, colloidal silica, clay, SiC particles, organic binder, resin balloon, dispersant, water and the like can be used. Moreover, there is not any special restriction on a coating method with the outer periphery coating material, and an example of the method is a method of coating the cuter peripheral surface of the joined honeycomb segment assembly by a rubber spatula while rotating the assembly on a potter's lathe.

EXAMPLES

Hereinafter, examples of the present invention will specifically be described, but the present invention is not limited to these examples.

Experiment Example 1

First, as ceramic raw materials, SIC powder and metal Si powder were mixed at a mass ratio of 80:20, and to this mixture, methylcellulose and hydroxypropoxyl methylcellulose as forming auxiliaries, starch and water-absorbing resin as pore formers, a surfactant and water were added and kneaded, to prepare a quadrangular pillar-like kneaded material by a vacuum clay kneader.

Next, the kneaded material was extruded by using a predetermined die, to obtain a formed honeycomb body in which a cell shape was quadrangular and the whole shape was a quadrangular pillar shape. Then, the formed honeycomb body was dried by a microwave dryer, and further completely dried by a hot air dryer, and then both end surfaces of the formed honeycomb body were cut, to regulate a predetermined dimension. Next, masks were attached to both the end surfaces of the formed honeycomb body. Afterward, holes were made in portions of the above masks which corresponded to open frontal areas of predetermined cells in one end surface of the formed honeycomb body and open frontal areas of the remaining cells in the other end surface. Next, one end portion was immersed into a plugging slurry containing an SiC raw material, and then the other end portion was immersed into the plugging slurry. In consequence, the open frontal areas of the predetermined cells in the one end surface and the open frontal areas of the remaining cells in the other end surface were alternately charged with the plugging slurry in a so-called checkered pattern manner. Afterward, drying was performed by the hot air dryer, and further firing was performed at 1410 to 1440° C. for 15 hours, to obtain a fired honeycomb body (a honeycomb segment) in which plugged portions were alternately arranged in the open frontal areas of the predetermined cells in the one end surface and the open frontal areas of the remaining cells in the other end surface in the so-called checkered pattern manner.

A cross section of the obtained honeycomb segment which was orthogonal to a cell extending direction had an end portion width of 36.0 mm. Moreover, an area (a segment area) of the cross section of the honeycomb segment which was orthogonal to the cell extending direction, was 1296 $mm^2$, furthermore, a length of the honeycomb segment in the cell extending direction was 152.4 mm. Additionally, in the honeycomb segment, a partition wall thickness was 0.3 mm, and a tell density was 46.5 cells/$cm^2$.

Next, the predetermined number of the honeycomb segments were joined by a joining materiel, and dried, to form a joined honeycomb segment assembly in which the plurality of honeycomb segments were arranged adjacent to each other so that side surfaces of the honeycomb segments faced each other and in which the facing side surfaces were joined to each other by joining portions. In this case, the joined honeycomb segment assembly was prepared so that the assembly had a rectangular shape having an end surface aspect ratio of 1.0 to 2.0, and a thickness of each of the joining portions (hereinafter referred to as central joining portions sometimes) including corners present in the region of 25 mm or less from a straight line which passed through the center of a long axis and was parallel to a short axis was from 0.2 to 1.0 mm after drying, thereby manufacturing the plurality of joined honeycomb segment assemblies. Here, the corners were regions of the joining portions in the region of 10 mm or less from each intersection between the joining portion and an outer peripheral wall along a direction of the short axis. Each joined honeycomb segment assembly was prepared so that a thickness of each of the other joining portions was 1.0 mm after the drying.

Afterward, outer peripheries of the plurality of joined honeycomb segment assemblies were roughly processed and around, to obtain a desirable elliptic tubular shape. In this case, a holding position of each of the joined honeycomb segment assemblies in an outer periphery processing lathe was regulated so that the aspect ratio was from 1.0 to 2.0. After the outer periphery processing, an cuter periphery coating treatment of the joined honeycomb segment assembly was performed, and an outer peripheral portion was disposed at the outermost periphery of the joined honeycomb segment assembly, to obtain a plurality of honeycomb structures as shown in FIG. 1. Additionally, as an outer periphery coating material used in the outer periphery coating treatment, a mixture of SiC particles and colloidal silica was used.

As described above, there were obtained 66 honeycomb structures each having a capacity of 2.5 L, a length of 152.4 mm, an aspect ratio of 1.0 to 2.0 and a central joining portion thickness of 0.2 to 1.0 mm.

The obtained honeycomb structures were subjected to "an electric furnace spelling test". In the electric furnace spelling test employed in the present example, all products were held in an electric furnace until the temperature reached 350° C. Afterward, the products were removed from the electric furnace to the atmospheric air with one motion, and cooled, to check whether or not cracks were generated in the products. This method is often used as a heat shock resistance test of an exhaust gas purifying ceramic loading body for an internal combustion engine. The results are shown in Table 1. In Table 1, a case where the cracks were not generated is described as OK, and a case where the cracks wars generated is described as NG. Additionally, the cracks generated in the case of NG were all generated in the joining portions.

TABLE 1

| Aspect ratio | Joining thickness (mm) of central joining portion | | | | | | |
|---|---|---|---|---|---|---|---|
| (long axis/short axis) | 0.2 | 0.4 | 0.5 | 0.6 | 0.8 | 1.0 | 1.5 |
| 1.0 | OK | OK | OK | OK | OK | OK | OK |
| 1.1 | OK | OK | OK | OK | OK | OK | OK |
| 1.2 | OK | OK | OK | OK | OK | OK | OK |
| 1.3 | OK | OK | OK | OK | OK | OK | OK |
| 1.4 | OK | OK | OK | OK | OK | OK | OK |
| 1.5 | OK | OK | OK | OK | OK | OK | OK |
| 1.6 | OK | OK | OK | OK | OK | OK | OK |
| 1.7 | NG | OK | OK | OK | OK | OK | OK |
| 1.8 | NG | OK | OK | OK | OK | OK | OK |
| 1.9 | NG | OK | OK | OK | OK | OK | OK |
| 2.0 | NG | NG | OK | OK | OK | OK | OK |

*Electric furnace spalling at 350° C.

From Table 1, it has been seen that the cracks were selectively generated in the honeycomb structures having a high aspect ratio and a small thickness of the central joining portion, Experiment Examples 2 and 3

The procedures of Experiment Example 1 were repeated, except that a temperature of an electric furnace was set to 400® C. (Experiment Example 2) and 450° C. (Experiment Example 3), to carry out experiments. The results are shown in Tables 2 and 3. In Tables 2 and 3, a case where cracks were not generated is described as OK, and a case where the cracks were generated is described as NG. Additionally, the cracks generated in the case of NG were all generated in joining portions.

TABLE 2

| Aspect ratio | Joining thickness (mm) of central joining portion | | | | | | |
|---|---|---|---|---|---|---|---|
| (long axis/short axis) | 0.2 | 0.4 | 0.5 | 0.6 | 0.8 | 1.0 | 1.5 |
| 1.0 | OK | OK | OK | OK | OK | OK | OK |
| 1.1 | OK | OK | OK | OK | OK | OK | OK |
| 1.2 | OK | OK | OK | OK | OK | OK | OK |
| 1.3 | OK | OK | OK | OK | OK | OK | OK |
| 1.4 | NG | OK | OK | OK | OK | OK | OK |
| 1.5 | NG | OK | OK | OK | OK | OK | OK |
| 1.6 | NG | OK | OK | OK | OK | OK | OK |
| 1.7 | NG | OK | OK | OK | OK | OK | OK |
| 1.8 | NG | OK | OK | OK | OK | OK | OK |

TABLE 2-continued

| Aspect ratio | Joining thickness (mm) of central joining portion | | | | | | |
|---|---|---|---|---|---|---|---|
| (long axis/short axis) | 0.2 | 0.4 | 0.5 | 0.6 | 0.8 | 1.0 | 1.5 |
| 1.9 | NG | NG | OK | OK | OK | OK | OK |
| 2.0 | NG | NG | OK | OK | OK | OK | OK |

*Electric furnace spalling at 400° C.

TABLE 3

| Aspect ratio | Joining thickness (mm) of central joining portion | | | | | | |
|---|---|---|---|---|---|---|---|
| (long axis/short axis) | 0.2 | 0.4 | 0.5 | 0.6 | 0.8 | 1.0 | 1.5 |
| 1.0 | OK | OK | OK | OK | OK | OK | OK |
| 1.1 | OK | OK | OK | OK | OK | OK | OK |
| 1.2 | NG | OK | OK | OK | OK | OK | OK |
| 1.3 | NG | OK | OK | OK | OK | OK | OK |
| 1.4 | NG | OK | OK | OK | OK | OK | OK |
| 1.5 | NG | OK | OK | OK | OK | OK | OK |
| 1.6 | NG | OK | OK | OK | OK | OK | OK |
| 1.7 | NG | NG | OK | OK | OK | OK | OK |
| 1.8 | NG | NG | OK | OK | OK | OK | OK |
| 1.9 | NG | NG | OK | OK | OK | OK | OK |
| 2.0 | NG | NG | OK | OK | OK | OK | OK |

*Electric furnace spalling at 450° C.

From Table 2 and Table 3, it has been seen that also in Experiment Examples 2 and 1, the cracks were selectively generated in honeycomb structures having a high aspect ratio and a small thickness of the central joining portion in the same manner as in Experiment Example 1. Furthermore, from Tables 1 to 3, it has been found that when the aspect ratio was 1.2 or more and when the thickness of the central joining portion was not 0.5 mm or more, the cracks were generated at low temperatures, Experiment Examples 4 to 6

Figure 4:
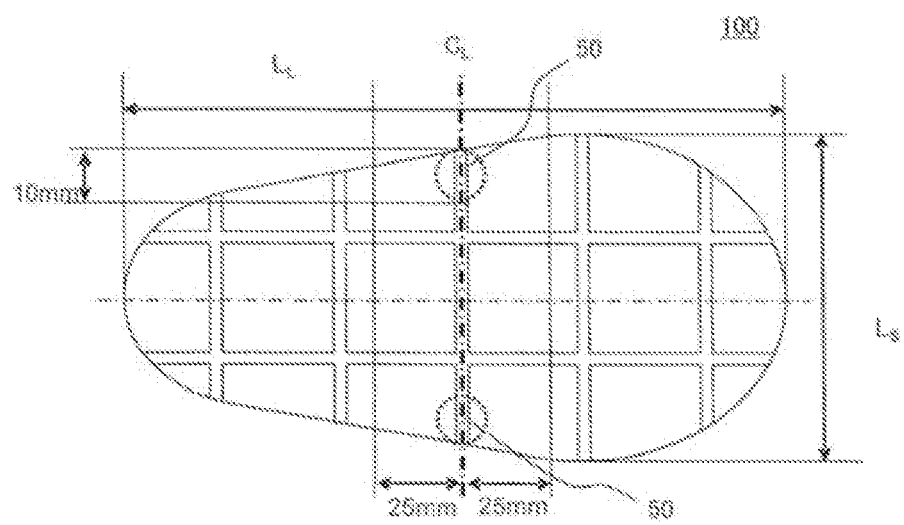
FIG. 4 is a plan view showing an end surface of a second embodiment of the honeycomb structure of the present invention.
Figure 5:
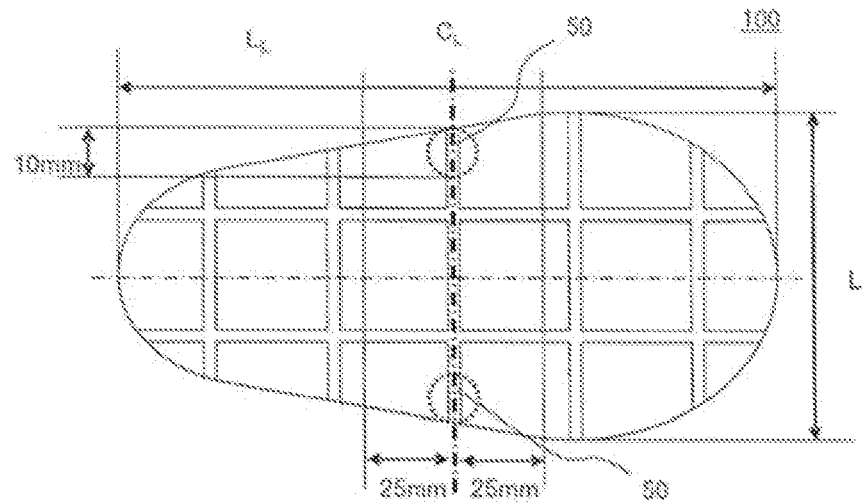
FIG. 5 is a plan view showing an end surface of a third embodiment of the honeycomb structure of the present invention.
Figure 6:
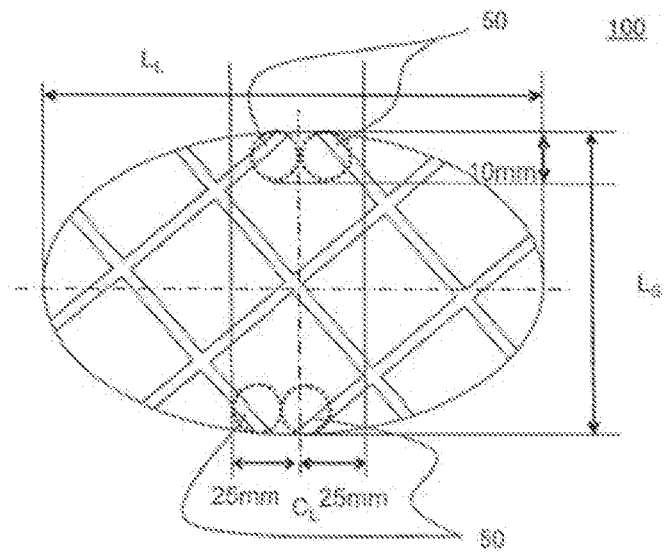
FIG. 6 is a plan view showing an end surface of a fourth embodiment of the honeycomb structure of the present invention.

The procedures of Experiment Example 1 were repeated, except that in shapes of honeycomb structures, end surfaces were formed into such shapes as shown. In FIG. 4, FIG. 5 and FIG. 6, to carry out experiments. The results similar to those of Experiment Example 1 were obtained, Experiment Example 7

Figure 7:
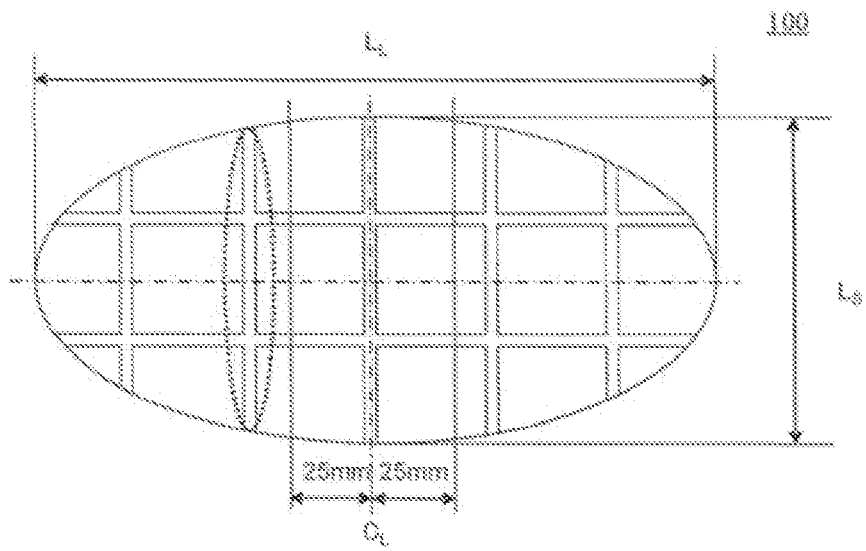
FIG. 7 is a plan view showing an end surface of a fifth embodiment of the honeycomb structure of the present invention.

FIG. 7 is a plan view showing a shape of each end surface of a honeycomb structure used in Experiment Example 7. In Experiment Example 7, the procedures of Experiment Example 1 were repeated, except that a thickness of each of joining portions of broken line portions which were the joining portions other than joining portions including corners present in the region of 25 mm or less from a straight line which passed through the center of a long axis and was parallel to a short axis was from 0.2 to 1.0 mm, a thickness of each of the other joining portions was 1.0 mm, and a temperature of an electric furnace was 450° C., to carry out an experiment. The results are shown in Table 4. In Table 4, a case where cracks were not generated is described as OK, and a case where the cracks were generated is described as NG, additionally, the cracks generated in the case of NG were all generated in the joining portions.

TABLE 4

| Aspect ratio (long axis/short axis) | Joining thickness (mm) of broken line portion of FIG. 7 | | | | | | |
|---|---|---|---|---|---|---|---|
| | 0.2 | 0.4 | 0.5 | 0.6 | 0.8 | 1.0 | 1.5 |
| 1.0 | OK | OK | OK | OK | OK | OK | OK |
| 1.1 | OK | OK | OK | OK | OK | OK | OK |
| 1.2 | OK | OK | OK | OK | OK | OK | OK |
| 1.3 | OK | OK | OK | OK | OK | OK | OK |
| 1.4 | OK | OK | OK | OK | OK | OK | OK |
| 1.5 | OK | OK | OK | OK | OK | OK | OK |
| 1.6 | OK | OK | OK | OK | OK | OK | OK |
| 1.7 | OK | OK | OK | OK | OK | OK | OK |
| 1.8 | OK | OK | OK | OK | OK | OK | OK |
| 1.9 | OK | OK | OK | OK | OK | OK | OK |
| 2.0 | OK | OK | OK | OK | OK | OK | OK |

*Electric furnace spalling at 450° C.

As apparent from Table 4, even when the thickness of each of the joining portions which were 25 mm or more away from a straight line which passed through the center of a long axis and was parallel to a short axis decreased, a strength against crack generation did not especially deteriorate.

Experiment Example 8

Figure 8:
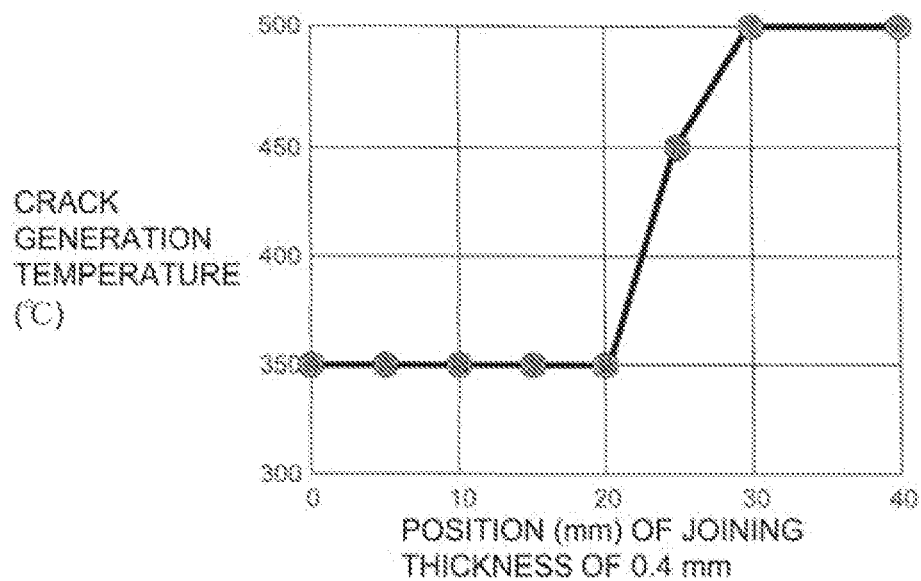
FIG. 8 is a graph showing a relation between a position where a thickness of a joining portion (a joining width) is 0.4 mm and a crack generation temperature.

The procedures of Experiment Example 1 were repeated, except that a thickness of each of joining portions including corners at positions of 0 to 40 mm away from a straight line which passed through the center of a long axis and was parallel to a short axis was 0.4 mm, a thickness of each of the other join lag portions was 1.0 mm, and an aspect ratio was 1.8, to carry out an experiment. The results are shown in FIG. 8. FIG. 8 is a graph showing a relation between a crack generation temperature and a position where the thickness of each joining portion (a joining width) is 0.4 mm. In FIG. 8, the abscissa indicates the position where the joining thickness is 0.4 mm, i.e., a distance (mm) from a straight line which passes through the center of a long axis and is parallel to a short axis, and the ordinate indicates the crack generation temperature. As apparent from FIG. 8, in a region of 25 mm or less from the straight line which passed through the center of the long axis and was parallel to the short axis, the crack generation temperature noticeably lowered.

Figure 9:
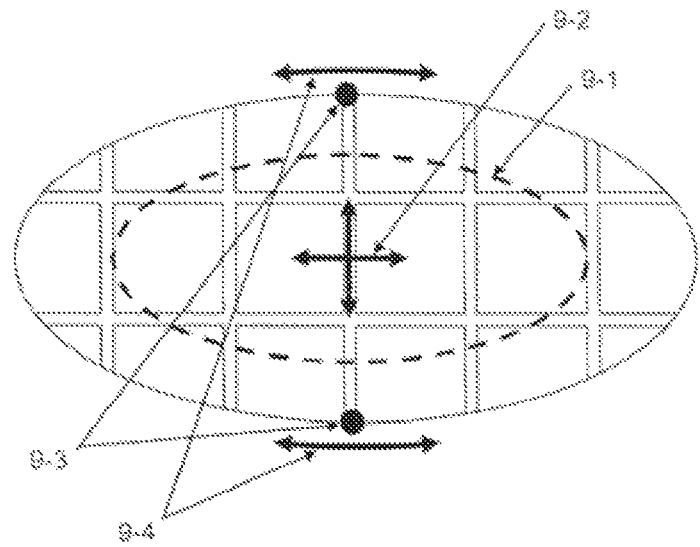
FIG. 9 is a plan view showing the end surface of the first embodiment of the honeycomb structure of the present invention, and is a view for explaining a mechanism of the crack generation of the honeycomb structure.

FIG. 9 is a plan view showing one end surface of the first embodiment of the honeycomb structure of the present invention, and is a view for explaining a mechanism of the crack generation of the honeycomb structure. When a DPF central portion has a high temperature and an outer peripheral portion, has a low temperature and when 9-1 is a boundary between the high temperature and the low temperature, such an expanding force as in 9-2 is generated in the central portion. In the outer peripheral portion, which is a lower temperature region, the expansive force is not generated so much as in the central portion, and a tensile stress is generated as shown by 9-4. When the aspect ratio is 1 or more, the tensile stress is maximized in the central portion of a long axis direction as shown by 9-3. When joining portions are present in the central portion, the cracks are generated in the joining portions, because a peel strength of the joining portions is smaller than a base material strength. As a joining material for use in the joining portions, a material having a predetermined Young's modulus is usually used to prevent such cracks from being generated. However, when joining layers are thin, the stress cannot be absorbed with the Young's modulus of the joining material, which results in the generation of the cracks.

INDUSTRIAL APPLICABILITY

A honeycomb structure of the present invention can be used as a filter to collect fine particles in an exhaust gas discharged from an internal combustion engine or the like.

DESCRIPTION OF REFERENCE NUMERALS

2: end surface, 4: cell, 5: partition wall, 8: plugged portion, 10: honeycomb segment, 11: honeycomb structure section, 20: outer peripheral wall, 40: joining portion, 50: corner present in a region of 25 mm or less from a straight line which passes through the center of a long axis and is parallel to a short axis, 100: honeycomb structure, $L_L$: long axis, $L_S$: short axis, C: center of long axis $L_L$, $C_L$: straight line which passes through the center C of the long axis $L_L$ and is parallel to the short axis $L_S$, S: slant portion, 9-1: boundary between high temperature and low temperature, 9-2: expanding force, 9-3: long axis direction central portion, and 9-4: tensile stress.

The invention claimed is:

1. A honeycomb structure comprising:
a plurality of honeycomb segments each having porous partition walls with which a plurality of cells extending from one end surface to the other end surface are formed to become through channels of a fluid, and plugged portions arranged in open frontal areas of the predetermined cells in the one end surface and open frontal areas of the remaining cells in the other end surface, the honeycomb segments being arranged adjacent to each other so that side surfaces of the honeycomb segments face each other;
joining portions in which the facing side surfaces of the plurality of honeycomb segments are joined to each other; and
an outer peripheral wall which covers an outer peripheral surface of a honeycomb structure section constituted of the plurality of honeycomb segments and the joining portions,
the honeycomb structure having an aspect ratio (a long axis/a short axis) of 1.2 or more, in which the long axis is the longest portion on each of the end surfaces of the honeycomb structure, the short axis is the longest portion orthogonal to the long axis on the end surface, and the length of the short axis is 150 mm or more,
wherein corners which are regions of the joining portions in the region of 10 mm or less from each intersection between the joining portion and the outer peripheral wall along a direction of the short axis are present in the region of 25 mm or less from a straight line which passes through the center of the long axis and is parallel to the short axis, and a thickness of each of the joining portions including the corners present in the region of 25 mm or less from the straight line which passes through the center of the long axis and is parallel to the short axis is 0.5 mm or more and 5 mm or less, a thickness of each of the other joining portions is 1.5 mm or less, and the thickness of each of the other joining portions is smaller than the thickness of each of the joining portions including the corners present in the region of 25 mm or less.

2. The honeycomb structure according to claim 1,
wherein the thickness of each of the joining portions including the corners present in the region of 25 mm or less from the straight line which passes through the center of the long axis and is parallel to the short axis is 1 mm or more and 1.5 mm or less.

3. The honeycomb structure according to claim 2,
wherein the joining portions other than the joining portions including the corners present in the region of 25 mm or less from the straight line which passes through the center of the long axis and is parallel to the short axis include at least one joining portion having a thickness smaller than 0.5 mm.

4. The honeycomb structure according to claim 1,
wherein the joining portions other than the joining portions including the corners present in the region of 25 mm or less from the straight line which passes through the center of the long axis and is parallel to the short axis include at least one joining portion having a thickness smaller than 0.5 mm.

\* \* \* \* \*